United States Patent [19]
Orimo et al.

[11] Patent Number: 5,333,265
[45] Date of Patent: Jul. 26, 1994

[54] REPLICATED DATA PROCESSING METHOD IN DISTRIBUTED PROCESSING SYSTEM

[75] Inventors: Masayuki Orimo, Kawasaki; Kinji Mori, Machida; Shigeki Hirasawa, Kawasaki; Hiroshi Fujise, Yokohama; Masuyuki Takeuchi, Fujisawa; Hitoshi Suzuki, Owariasahi, all of Japan

[73] Assignee: Hitachi, Ltd., Tokyo, Japan

[21] Appl. No.: 780,337

[22] Filed: Oct. 22, 1991

[30] Foreign Application Priority Data

Oct. 22, 1990 [JP] Japan .................. 2-283777

[51] Int. Cl.$^5$ .................. G06F 12/00; G06F 15/16
[52] U.S. Cl. .................. 395/200; 395/575
[58] Field of Search ........... 395/200, 600, 650, 575; 371/7, 47.1

[56] References Cited

U.S. PATENT DOCUMENTS

| | | | |
|---|---|---|---|
| 4,224,664 | 9/1980 | Trinchieri | 395/575 |
| 4,321,666 | 3/1982 | Tasar et al. | 395/575 |
| 4,354,230 | 10/1982 | Murphy et al. | 395/800 |
| 4,627,019 | 12/1986 | Ng | 395/600 |
| 4,853,932 | 8/1989 | Nitschke et al. | 371/68 |
| 4,881,166 | 11/1989 | Thompson et al. | 395/600 |
| 4,912,707 | 3/1990 | Kogge et al. | 371/12 |
| 5,012,405 | 4/1991 | Nishikado et al. | 395/600 |
| 5,056,003 | 10/1991 | Hammer et al. | 395/600 |
| 5,062,045 | 10/1991 | Janis et al. | 395/600 |
| 5,095,421 | 3/1992 | Freund | 395/650 |
| 5,136,707 | 8/1992 | Block et al. | 395/600 |
| 5,170,480 | 12/1992 | Mohan et al. | 395/600 |

FOREIGN PATENT DOCUMENTS 392942 6/1989 Japan .

OTHER PUBLICATIONS

"Nikkei Electronics", #502, Jun. 11, 1990, pp. 121–148.
"Electronic Information Communication Handbook", published by Ohm Sha Ltd., 1988, pp. 1615–1626.
M. Ahamad, et al, "Fault-Tolerant Atomic Distributed System", Distributed Computing, vol. 4, No. 2, pp. 69–80, Jun. 1990.
E. Cooper, "Replicated Procedure Call", Operating Systems Review, vol. 20, No. 1, pp. 44–56, Jan. 1986.
K. Kant, "Performance Analysis of Real-Time Software. Supporting Fault-Tolerant Operation", IEEE Transactions on Computer, vol. 39, No. 7, pp. 906–918, Jul. 1990.
N. Natarajan, et al, "Synchronization of Redundant Computation in a Distributed System", Sixth Symposium on Reliability in Distributed Software and Database Systems, pp. 139–148, Mar. 1987.

Primary Examiner—Dale M. Shaw
Assistant Examiner—D. Dinh
Attorney, Agent, or Firm—Antonelli, Terry, Stout & Kraus

[57] ABSTRACT

A replicated data processing method and apparatus for a distributed processing system are provided in which a plurality of processors are connected to one another through a common transmission line. The processors perform processes using replicated data produced by resources such as files replicated in respective processors. Any processor issues an access request and broadcasts the request to the common transmission line. User's program of the processor is initiated by a first-received data in response to the request, and checks matching between the first-received data of the replicated data and the subsequently received data to repeat a retry processing for the request until a mismatch is removed.

18 Claims, 13 Drawing Sheets

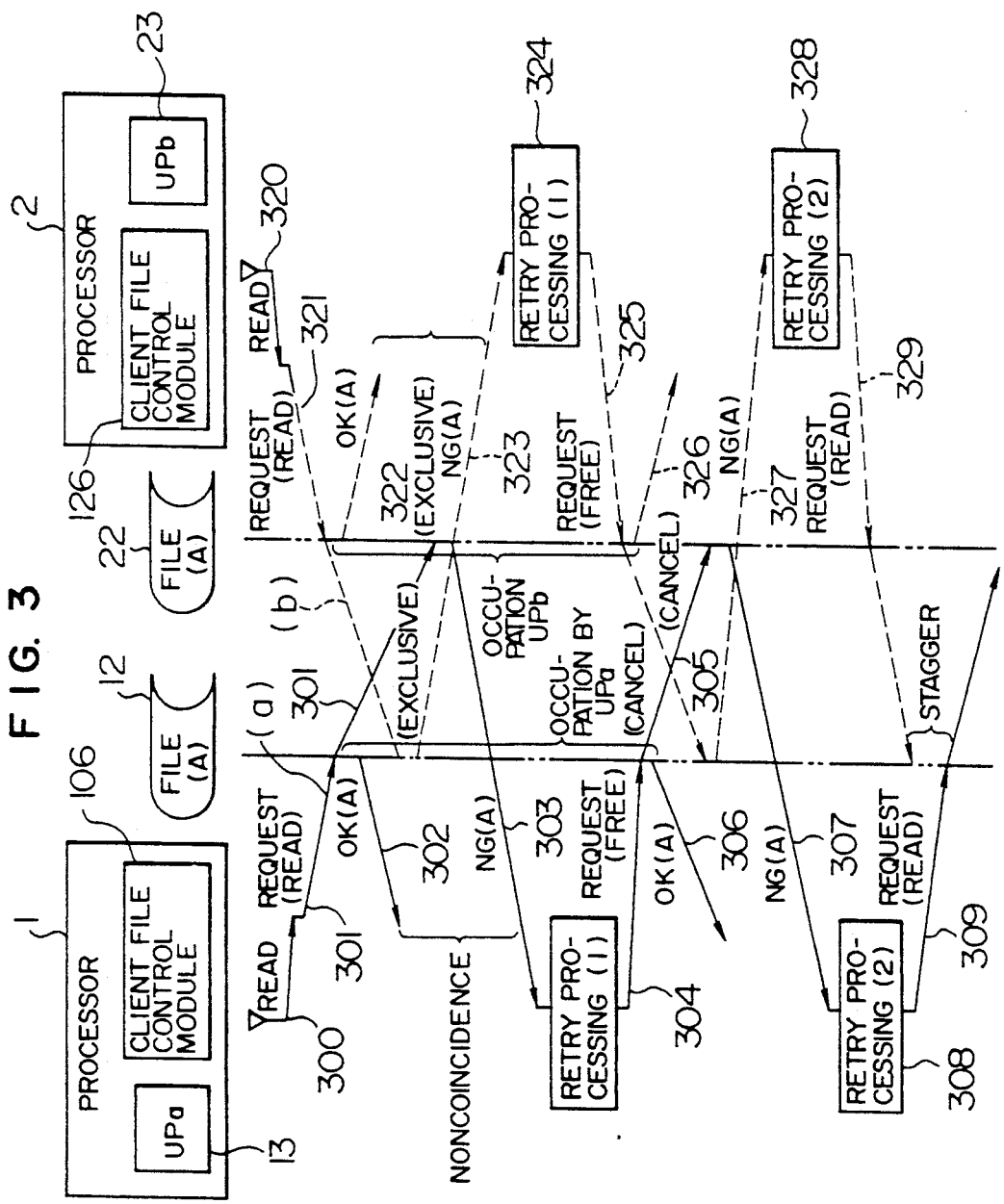

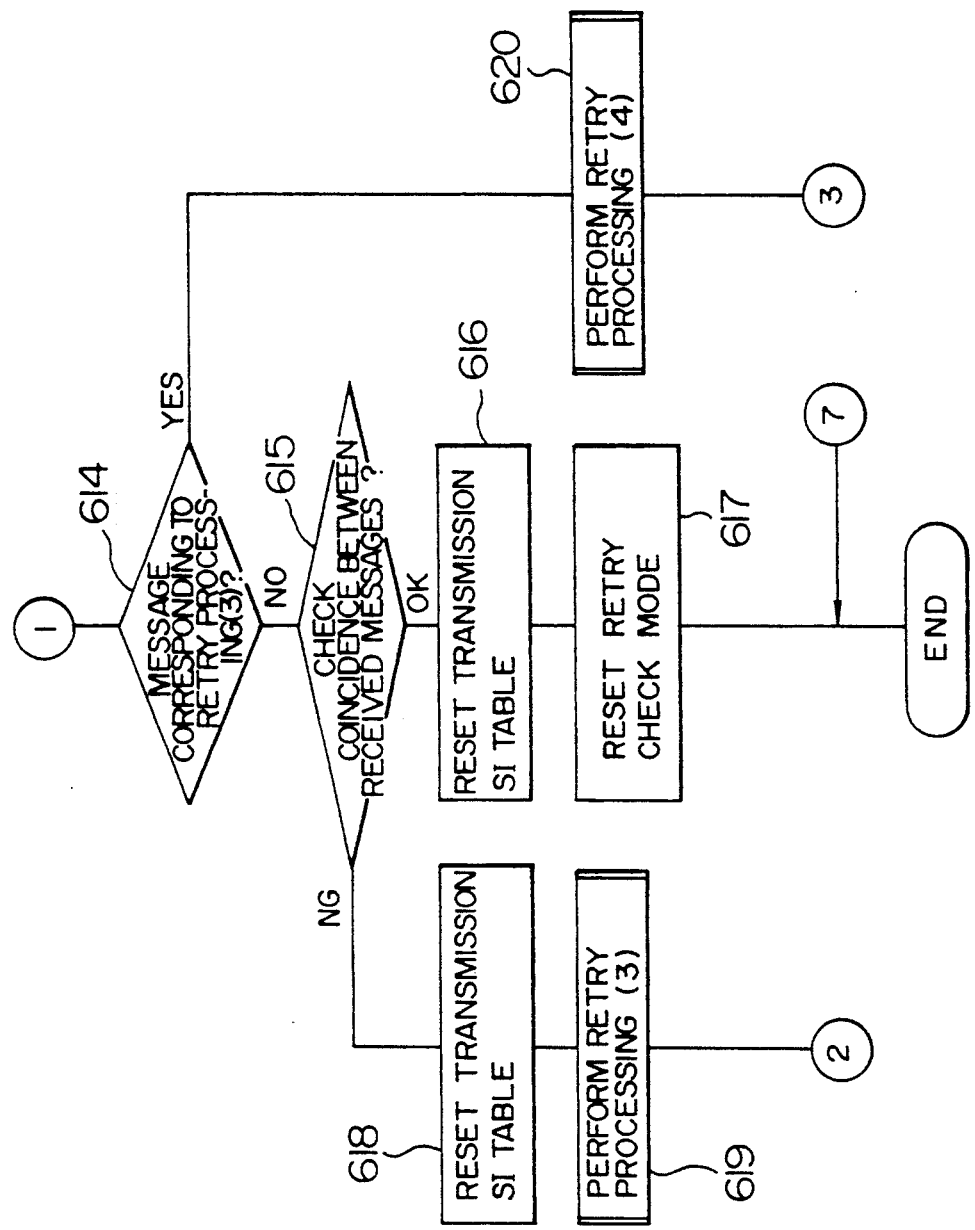

REPLICATED DATA PROCESSING METHOD IN DISTRIBUTED PROCESSING SYSTEM

BACKGROUND OF THE INVENTION

The present invention relates to a replicated data processing method of distributed processing system in which a plurality of processors respectively having replicated resources are coupled by a network and those processors take partial charge to process data generated from the replicated resources. In particular, the present invention relates to a replicated data processing method of distributed processing system suitable for conducting highly reliable distributed processing efficiently.

At the present time, computers are used in a wide area, and various researches and developments are in progress mainly aiming at improvement of computers in high speed and reliability.

In particular, growth of distributed processing systems in the computer industry is anticipated as the fourth wave following main frames in the middle 1960s to the middle 1970s, minicomputers in the middle 1970s to the early 1980s, and personal computers in 1980s.

The term "distributed processing system" refers to a system which uses the whole of a network connecting a plurality of computers as if it is a single computer.

Further, the term "distributed processing" refers to a processing form whereby a plurality of computers coupled by communication lines cooperate to process one job. Each computer has a processor for executing a part of that job, and those processors send and receive messages to perform their processes.

An object of distributed processing is to attain decentralization of function, decentralization of load, decentralization of region, and higher reliability by decentralizing all jobs, which have heretofore been so centralized upon one computer as to be processed, to a plurality of computers so as to be processed therein.

That is, respective computers are reduced in size and improved in economization by providing respective computers with only their respective necessary functions to decentralize functions. In addition, respective computers have high functions, and hence a system of high functions can be constructed.

Jobs exceeding the capabilities of calculation speed, storage capacity, and input/output speed of one computer can also be decentralized or distributed to a plurality of computers and processed therein. As a result, an increase or decrease in load can be coped with flexibly.

Further, if all of a large amount of data are transmitted to one computer located at a long distance and processed therein, it takes a long time to transmit data. If area distribution is used and simple preprocessing is conducted by an area computer to transmit the result alone to the center, however, a part of the processing result is obtained on the spot. Further, a small amount of transmitted data suffices.

In case all processing is performed by one computer, the entire system stops if that computer gets out of order. Even if one computer gets out of order in case jobs are allotted to a plurality of computers by means of distributed processing, however, the processing can be continued by remaining computers with somewhat degraded performance, resulting in improved system reliability.

Such distributed processing is described in "Electronic Information Communication Handbook" (edited by The Institute of Electronics, Information and Communication Engineers and published by OHM SHA LTD. in 1988), pp. 1615-1626.

Some of distributed processing in recent years support distributed processing between different kinds of machines for connecting products of different manufacturers via a network as described in Japanese periodical "Nikkei Electronics, 1990 6-11 no. 502" (published by Nikkei BP Ltd. in 1990), pp. 121-148.

In conventional methods for administering and controlling files in distributed processing systems, there is a method of multiplexing only important files with an arbitrary degree of replication and administering them.

As a method relating to the reliability of files thus replicated, there is a method of collecting data outputted from the replicated files in a computer using the data for a predetermined period and checking matching among collected data.

However, such a conventional control method of replicated files in distributed processing systems has a problem that a recovery method upon occurrence of noncoincidence among contents of the collected data is not considered and the processing of accessing the file stops when a noncoincidence state or mismatching has occurred.

Since matching between data outputted from replicated files is checked after collection for the predetermined period, an access processing is delayed by that time, resulting in another problem.

SUMMARY OF THE INVENTION

An object of the present invention is to provide a replicated data processing method and system of distributed processing system for solving these problems of the prior art, which can recover automatically from a mismatching state among files replicated with an arbitrary replication degree, without interrupting the processing of file access even when mismatching among the replicated files has occurred, and detect a mismatching state occurring among the replicated files without lowering file access response performances, to improve the processing performances and reliability of the distributed processing system.

In order to achieve the above-described objects in accordance with an aspect (1) of the present invention, there is provided a replicated data processing method for a distributed processing system in which a plurality of processors are connected via a common transmission medium and those processors perform processes using first received data of replicated data generated by resources replicated in respective processors, and check matching between the first received data and a replicated data subsequently received.

In accordance with another aspect (2) of the present invention, a replicated data processing method for distributed processing system defined in the above aspect (1) may provide that files are replicated in each of external storage media respectively connected to a plurality of processors, and an arbitrary processor among the plurality of processors issues a request to access replicated files, receives replicated response data from the replicated files corresponding to the access request, advances processes using response data received first among the replicated response data, and checks the matching of response data received first using replicated response data received thereafter.

In accordance with another aspect (3) of the present invention a replicated data processing method for distributed processing system defined in the aspect (2) may provide that the processor which has issued the access request does not generate a next file access request until checking of coincidence between replicated response data is completed.

In accordance with another aspect (4) of the present invention, a replicated data processing method for distributed processing system defined in the aspect (3) may provide that when a mismatch between response data is detected by checking of matching between response data, the processor which has generated the access request performs a first retry processing issuing an instruction for cancelling a file state established by the access request, performs a second retry processing for generating the access request again after the file state established by the first retry processing has been cancelled, and repeats the first retry processing and the second retry processing until mismatching between response data disappears.

In accordance with another aspect (5) of the present invention, a multiplexed data processing method for distributed processing system defined in the aspect (4) may provide that instead of repeating the first retry processing and the second retry processing until mismatching between response data disappears, the processor which has generated the access request executes the second retry processing with an arbitrary preset time shift.

In accordance with another aspect (6) of the present invention, a replicated data processing method for distributed processing system defined in the aspect (4) or (5) may provide that the processor which has generated the access request does not perform a processing using response data received first, but collects all response data fed from replicated files and performs the processing after checking of matching among all of collected response data and determination of matching between response data as a result of the first retry processing and the second retry processing.

In accordance with another aspect (7) of the present invention, a replicated data processing method for distributed processing system defined in any one of the aspects (4) to (6) may provide that the processor which has generated the access request performs the first retry processing and the second retry processing on the basis of a check result on matching among all response data fed from replicated files and collected within an arbitrarily preset time period.

In accordance with another aspect (8) of the present invention, a replicated data processing method for distributed processing system defined in the aspect (7) may provide that if all of response data from replicated files cannot be collected within an arbitrarily preset time period, the processor which has generated the access request performs a fault or failure processing for checking matching among response data collected within a preset time period and performs the matching check, the first retry processing and the second retry processing after the fault processing.

In accordance with another aspect (9) of the present invention, a replicated data processing method for distributed processing system defined in the aspect (4) may provide that as the first retry processing, the processor which has generated the access request issues a free command for cancelling an occupation state of a record established by exclusive control of a read command in case the access request is the read command at the time of file updating, issues an erase command for deleting a record added by an addition command in case the access request is the addition command, and issues a close command for cancelling an occupation state of a file established by an exclusive open command in case the access request is the exclusive open command.

In accordance with a further aspect (10) of the present invention, a replicated data processing method for distributed processing system defined in either of the aspects (4) to (6) may provide that the plurality of processors broadcast messages such as an access request message and an access response message to the transmission medium and performs distributed processings by sending and receiving the messages; each of the plurality of processors includes a communication control or administration module for broadcasting the message to be fed from its own processor to the transmission medium connected to other processors and for taking in a message relating to its own processor from the messages broadcasted to the transmission medium, a client file control or administration module for delivering the message taken in by the communication control module to a user program for processing the message and generating an access request message and transmitting it to the communication administration module on the basis of a file access instruction fed from the user program, and transmission information storage means for storing message information transmitted to the communication administration module by the client file administration module; and the processor which has generated the access request transmits the message to the transmission medium via the communication administration module by using the client file administration module, stores simultaneously therewith an arbitrarily preset collection time period to be used for the matching check into the transmission information storage means, and makes a check on matching among all of response data fed from the replicated files and performs the first retry processing and the second retry processing on the basis of the time period stored in the transmission information storage means.

In the operation of the aspects of the present invention, each processor receives a plurality of response data transmitted from multiplexed files on the basis of an access instruction issued by itself. At this time, each processor transfers response data received first from the multiplexed files to the user program at the timing of receiving and simultaneously stores it in its own processor.

Each processor then compares response data subsequently received with the response data first received, and checks on occurrence of mismatching between response data (i.e., between replicated files).

If a disagreement between response data is detected at this time, its own processor which has issued the access instruction first issues an instruction for cancelling the access instruction issued for replicated files and cancels a file state established by the access instruction of its own processor (the first retry processing). The processor then issues the same access instruction again (the second retry processing).

A mismatching state between replicated files is established when a plurality of processors access replicated files at the same time. An access instruction is re-issued by each processor at an individual timing. Therefore, time points of reissue of access instructions performed by respective processors are automatically staggered with each other. As for the reissued access instruction, occurrence of a mismatching state is thereby avoided automatically.

Even if mismatching occurs among files replicated with an arbitrary degree of replication, therefore, an automatic recovery from the mismatching state is made without interrupting the file access processing.

Control is returned to the user program at the timing of the first reception of a response from replicated files. Therefore, a file access response performance is not lowered by a check on the matching between files.

BRIEF DESCRIPTION OF THE DRAWINGS

FIG. 3 is a time chart showing an embodiment of processing operation in the distributed processing system of FIG. 1 according to the present invention;

FIGS. 6A-6D totally are flow charts explaining processings according to another embodiment of the present invention;

DESCRIPTION OF THE PREFERRED EMBODIMENTS

For better understanding of the invention, it is noted that prior to the invention, the present inventors have developed file storage and file access methods as disclosed in JP-A-03-92942 laid-open Apr. 18, 1991, the contents of which are incorporated herein by reference, but not prior art in the terms of U.S. statutes.

That is, the file storage method for a computer system including processors and storages for storing data, wherein a file representing a group of information is stored or is replicated in the storage on any logical-unit basis. The file access method comprises issuing a file access request in a specific processor, determining the position of a requested file on the basis of information stored in a table provided in its own processor and accessing the requested files based on the determined position. The implementing configuration is illustrated in FIG. 8.

Figure 8:
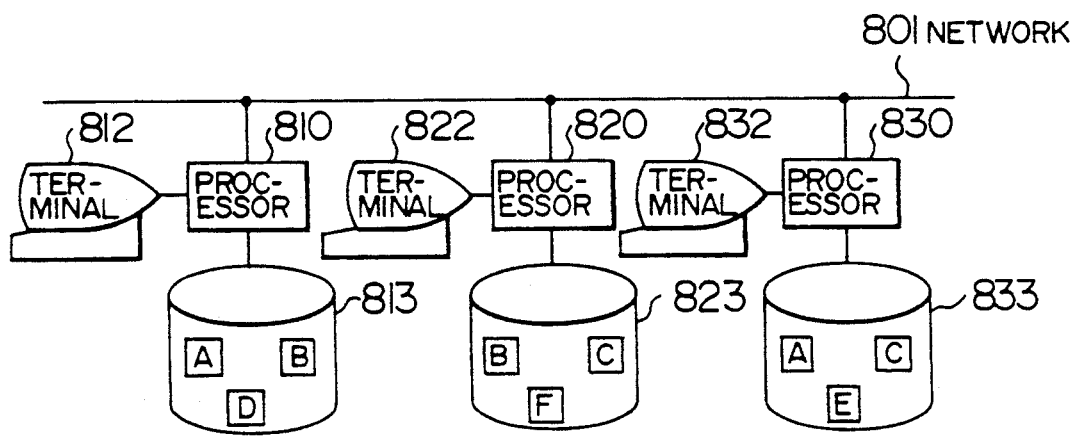
FIG. 8 is a block diagram showing an example of a distributed data processing system related with the present invention.

FIG. 8 shows an example of a file access and storage system in which a plurality of processors 810, 820 and 830 are connected via a common network 801 to enable access to each other. Each of the processors includes a terminal 812, 822 or 832 and a disk device 813, 823 or 833. Disk devices 813, 823 and 833 are equipped with files A, B and D, files B, C and F and files A, C and E, respectively. Thus, the file A is replicated in the processors 810 and 830, and the files B and C are replicated in the processors 810 and 820 and the processors 820 and 830. The replication degree of file is arbitrarily determined depending upon the significant degree of files.

Embodiments of the present invention will hereafter be described in detail with reference to the accompanying drawings.

Figure 1:
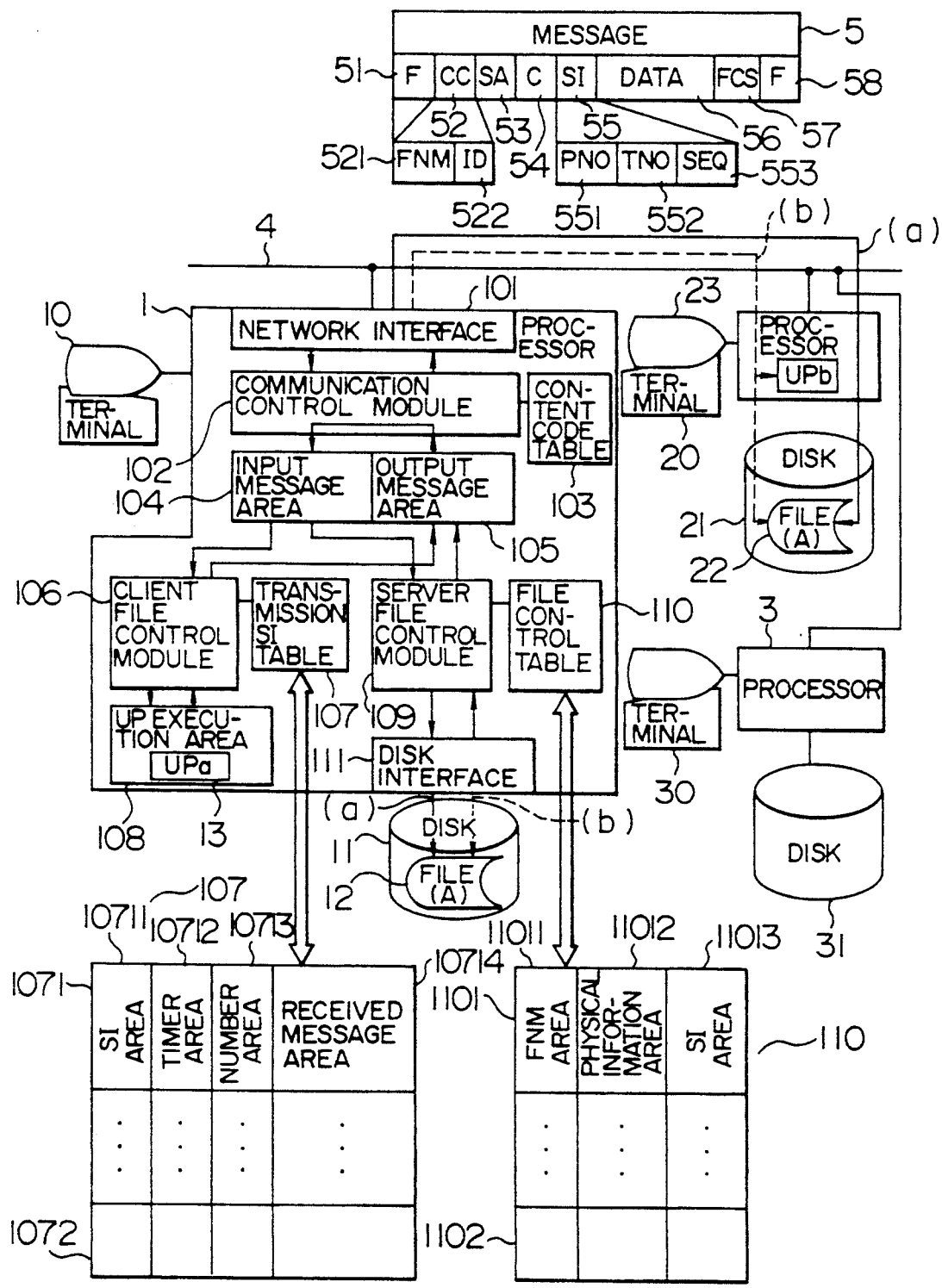
FIG. 1 is a block diagram showing a first embodiment of a configuration according to the present invention in a distributed processing system to which the present invention is applied.

FIG. 1 show in a block diagram a first embodiment of configuration of a distributed processing system according to the present invention.

The distribution processing system includes a network 4 of bus type, processors 1-3 for executing processes, terminals 10, 20 and 30, each having a processing manipulation instruction inputting function and a processing result display function, which are respectively connected to the processors 1-3, and disk devices 11, 21 and 31 respectively connected to the processors 1-3 for storing data to be processed.

The disk device 11 of the processor 1 and the disk device 21 of the processor 2 have replicated files (A) 12 and 22, respectively.

The processor 1 has a user program 13 (hereafter referred to as UPa 13), and the processor 2 has a user program 23 (hereafter referred to as UPb 23).

Each of the processors 1-3 for performing processings relating to the present invention performs a distributed processing by sending and reception of a message 5 transmitted on the network 4.

A description relating to the format configuration of the message 5 will now be given with reference to FIG. 1.

The message 5 includes flags 51 and 58 (denoted by F in FIG. 1) respectively indicating the start and end of the message 5, a content code 52 (denoted by CC indicating the contents of the message, a source address 53 (denoted by SA) for storing the processor number of a processor which has generated the current message, a serial number 54 (denoted by C) needed for transmission via the network 4, source information 55 (denoted by SI) indicating a user program (such as the UPa 13, for example) accessing a file, a data section 56 (denoted by Data) which is an area for storing information to be transmitted, and a FCS (Frame Check Sequencer) 57 which is an area for making a check on an error in transmission.

The content code 52 further includes a file name section 521 (denoted by FNM) indicating a file to be accessed, and an ID (IDentifier) section 522 indicating the classification of message such as a file access request or a file access response.

In the first embodiment, a file name is used as contents of the file name section 521 on the assumption that a file name is unique in the system. In the file name section 521, however, a code or the like corresponding to file contents may be used instead of the file name.

The source information 55 includes a processor No. information section 551 (denoted by PNO 551 in FIG. 1) which is an area for storing the processor No. of a processor which is executing a user program, a task No. information section 552 (denoted by TNO) which is an area for storing information indicating the program under execution, and a serial number information section 553 (denoted by SEQ) which is a sequential number area indicating the order of a message generated by the user program.

In the embodiment, each of processors 1-3 broadcasts a message 5 having such a format onto the network 4. Further, on the basis of contents of the content code 52 of the message 5 on the network, each processor 1-3 determines whether that message 5 is necessary for itself, and takes in only the necessary message 5.

Configuration of each of processors, 1-3 and its function will now be described by taking the processor 1 by way of example.

A network interface 101 is a module for interfacing with the network 4, and a disk interface 111 is a module for interfacing with the disk device 11.

On the basis of contents of the message 5 (content code 52) received from the network 4, a communication control module 102 determines whether the received message is necessary for its own processor. If the received message is a necessary message, the communication control module 102 stores it into an input message area 104. The communication control module broadcasts a message stored in an output message area 105 onto the network 4 via the network interface 101 as the message 5.

As for a transmitted message as well, the communication control module 102 at this time determines whether the transmitted message is necessary for its own processor in the same way as a message received from the network 4. If necessary, the communication control module 102 stores the transmitted message into the input message area 104.

Respectively, in the input message area 104 and the output message area 105, the received message and the transmitted message are so stored as to correspond to the content code 52.

In a content code table 103, the content code of the message needed for its own processor is registered. To be concrete, "file name" of the file in its own disk device 11 and a content code having a code indicating "access request" set therein are registered respectively in the file name section 521 and the ID section 522 of the message 5 when the processor is initialized, for example. In combination or singly in accordance with the execution situation of the user program, a content code having a code indicating an access response set therein is also registered in the ID section 522.

The communication control module 102 compares the content code 52 included in the received message 5 with the content code registered in the content code table 103 and takes in the message 5 when they coincide with each other.

A client file control module 106 delivers a message stored in the input message area 104 to the UPa 13 and performs a processing for storing the transmitting message fed from the UPa 13 into the output message area 105.

A transmission SI (Source Information) table 107 is a table into which contents of the source information 55 to be stored in the output message area 105 are so stored as to correspond to the content code 52 by the client file control module 106.

A user program execution area (denoted by UP execution area in the drawing) 108 is an area for executing a user program such as that stored in the UPa 13.

A file control table 110 and a server file control module 109 function to control or manage access to the file (A) 12 within the disk device 11 connected to its own processor 1.

Formats of the transmission SI table 107 and the file control table 110 will now be described.

The transmission SI table 107 has rows 1071-1072 corresponding to the source information 55 of the message 5 indicating the file access request. In each of these rows 1071-1072, a timer area 10712 for detecting timeout of a response to an access request, a number area 10713 for storing the number of messages indicating access responses to an access request, and a received message area 10714 for storing received access response messages are associated with a source information area (denoted by SI area in the drawing) 10711 for storing contents of the source information 55 of access request messages.

The file administration table 110 has rows 1101-1102 corresponding to files included in its own disk device 11. Each of rows 1101-1102 includes a file name area (denoted by FNM area in the drawing) 11011 for storing a code (a file name in the present embodiment) corresponding to each file, a physical information area 11012 for storing information indicating a disk and a position within the disk in which that file is stored, a source information area (denoted by SI area) for storing contents of source information (the source information 55 in the message 5) of an access request message for that file.

It is now assumed that the file name area 11011 and the physical information area 11012 are set beforehand at the time of file allocation.

Basic operation of transmission and reception of the message 5 performed between processors 1-3 in the distributed processing system of the present embodiment having such a configuration will hereafter be described.

First of all, transmission operation of the message 5 will now be described on the basis of processing operation of the client file control module 106 conducted when a file access instruction has been issued by the UPa 13.

The UPa 13 specifies the name of a file to be accessed and contents of access, and issues a file access instruction produced thereby.

The access instruction is taken in by the client file control module 106. The client file control module 106 produces a message having the content code 52, the source information 55 and the data section 56 which is shown in the format of the message 5 (FIG. 1) and set as described below, and stores it into the output message area 105.

That is, the file name specified by the UPa 13 has already been set into the file name section 521 of the content code 52, and a code indicating an access request has already been set into the ID section 522.

Its own processor number, has already been set in the processor No. information section (PNO) 551 of the source information 55. A No. assigned to the UPa 13 which has issued the file access instruction such as a task No. has already been set into the task No. information section (TNO) 552. A serial number indicating the order of issue of the access instruction has already been set into the serial number information section or message sequence section (SEQ) 553. Contents of access specified by the UPa 13 is already set into the data section 56.

At this time, contents of the source information 55 thus set are set into the source information area 10711, and a timer is set into the corresponding timer area 10712.

The message stored in the output message area 105 by the processing heretofore described is broadcasted to the network 4 as the message 5 by the communication control module 102.

Such a message is called "access request message".

Message receiving operation will now be described on the basis of processing operation of the server file control module 109.

On the basis of a request from the UPb 23, the client file control module of the processor 2, for example, broadcasts an access request message to the network 4 via the communication control module of the processor 2 in the format represented by the message 5.

That access request message is taken in a processor having a file, such as the file (A) 12, specified by the content code 52 within that message 5 in its own disk device, i.e., that access request message is taken in the processor 1 in the case assumed now. And the communication control module 102 in the processor 1 stores the access request message with respect to the file (A) 12 into the input message area 104.

The server file administration module 109 takes in this message from the input message area 104 and stores contents Of the source information 55 included in the message thus taken in into the source information area 11013 of the file administration table 110.

On the basis of contents of the physical information area 11012 included in the file control table 110, the server file control module 109 executes file access processing specified by the data section 56 in the message 5.

Further, on the basis of the result of this file access processing, the server file control module 109 produces a message indicating an access response having the content code 52, the source information 55 and the data section 56 of the message set as hereafter described and stores the message into the output message area 105. This message is called access "response message".

In the access response message, the name of an accessed file is set in the file name section 521 and a code indicating the access response is set in the ID section 522. Further, into the source information 55, the value of the source information in the access request message (i.e., the content of the source information area 11013 of the file control table) is set. And contents of the result of the file access is set into the data section. Herein, "contents of the result of the file access" involve information as to whether the access has normally been completed or not, and information indicating the contents of an abnormality in case the file access has been terminated abnormally. Hereafter, the information is referred to as status information. Further, in case of a READ command, read contents are also included.

The file access response message stored in the output message area 105 by the processing heretofore described is broadcasted to the network 4 as the message 5 by the communication control module 102.

The access response message is taken in by the processor 2 which is executing the user program which has generated the access request, i.e., the UPb 23.

In this way, the distributed processing system in the present embodiment sends and receives the message 5 between any of the processors 1-3 and advances distributed processings.

In the distributed processing system of the present embodiment having the configuration heretofore described, processing operation according to the present invention is conducted to cope with a problem described below.

First of all, the problem will now be described.

For example, it is now assumed that two user programs UPa 13 and UPb 23 simultaneously access the replicated files (A) 12 and 22.

The UPa 13 issues a file access command to make an access request. The file access command is transmitted to the file (A) 12 in the disk device 11 of its own processor 1 and the file (A) 22 in the disk device 21 of the processor 2.

In this case, the file (A) 12 in its own processor 1 which does not need intervention of the network 4 is processed earlier. A result of processing with respect to the file access command of the file (A) 12 is transmitted to the UPa 13 and an access response is thus made.

On the other hand, it is now assumed that the UPb 23 issues a file access command for the same record as that of the UPa 13 at the same time that the UPa 13 issues the file access command.

In the same way as the file access command of the UPa 13, the file access command of the UPb 23 is also transmitted to the file (A) 22 in the disk device 21 of its own processor 2 and the file (A) 12 in the disk device 11 of the processor 1.

In this case, the file (A) 22 in its processor 2 is processed earlier.

A result of processing of the file access command with respect to the file (A) 22 is transmitted to the UPb 23.

That is, such a state that the UPa 13 accesses the file (A) 12 and the UPb 23 accesses the file (A) 22 occurs.

In this state, the access command of the UPb 23 reaches the file (A) 12 and the access command of the UPa 13 reaches the file (A) 22. Depending on the contents of the access command in this case, states in the following described for example, occur even if there are no faults at all in hardware.

(i) In the case where the access command is a READ command for file update:

In case of file update, access from other user programs to a subject record in the file is inhibited from the time of READ acceptance until completion of WRITE processing to perform exclusive control of file access. Therefore, the access command (READ) of the UPb 23 with respect to the record of the file (A) 12 on which the UPa 13 is in the READ state is rejected as an exclusive error and it is not accepted.

In the same way, the READ command of the UPa 13 which has reached the file (A) 22 is also rejected as an exclusive error.

If the UPa 13 and UPb 23 perform WRITE processings in this state, the subject record of the file (A) 12 is updated by the UPa 13 and the subject record of the file (A) 22 is updated by the UPb 23. Therefore, the file (A) 12 differs in contents from the file (A) 22.

(ii) In the case where the access command is an ADD command for record addition:

In case the access command is an ADD command for the same record of the file, the addition contents of the UPa 13 are reflected in the file (A) 12 and the addition contents of the UPb 23 are reflected in the file (A) 22. As a result, the file (A) 12 differ in contents from the file (A) 22.

(iii) In the case where the access command is an exclusive OPEN command:

In case the access command is an exclusive OPEN command, such a state that only the access command of the UPa 13 is accepted for the file (A) 12 and only the access command of the UPb 23 is accepted for the file (A) 22 occurs. As a result, the file (A) 12 differs in contents from the file (A) 22.

In the distributed processing system of the present embodiment, each of processors 1-3 checks coincidence between response data fed from respective replicated files in order to solve the problems heretofore described. If noncoincidence between response data is detected, its own processor issues an instruction for cancelling an access instruction issued for replicated files (by first retry processing) and further issues a first access instruction again (by second retry processing).

At this time, reissue of the access instruction is performed by each processor at its individual timing. Therefore, timings of reissue of mutual access instructions are automatically staggered and occurrence of a mismatching state is automatically avoided.

If mismatching between files occurs, an instruction for cancelling the issued access instruction is thus issued (first retry processing) and thereafter the same access instruction as the first access instruction is issued again (second retry processing). Thereby, automatic recovery from the mismatching state becomes possible without interrupting the processing.

As heretofore described, the processors 1-3 in the distributed processing system of the present embodiment each allow respective user programs to simultaneously access replicated files while keeping matching between them.

The network configuration of the present embodiment and network configurations of the other embodiments which will be described later have a network of bus type. However, the network configuration is not limited to such type, but networks of any form may be used.

A plurality of terminals among terminals 10, 20 and 30 and a plurality of disks among disks devices 11, 21 and 31 may be connected to each of the processors 1-3. None of them may be connected to each of processors 1-3.

The present embodiment is described by way of example as to duplication files. However, the present invention can also be applied to replicated files more than the duplication files.

Operation of each processor according to the present invention in the distributed processing system of the embodiment will hereafter be described in further detail.

Figure 2A:
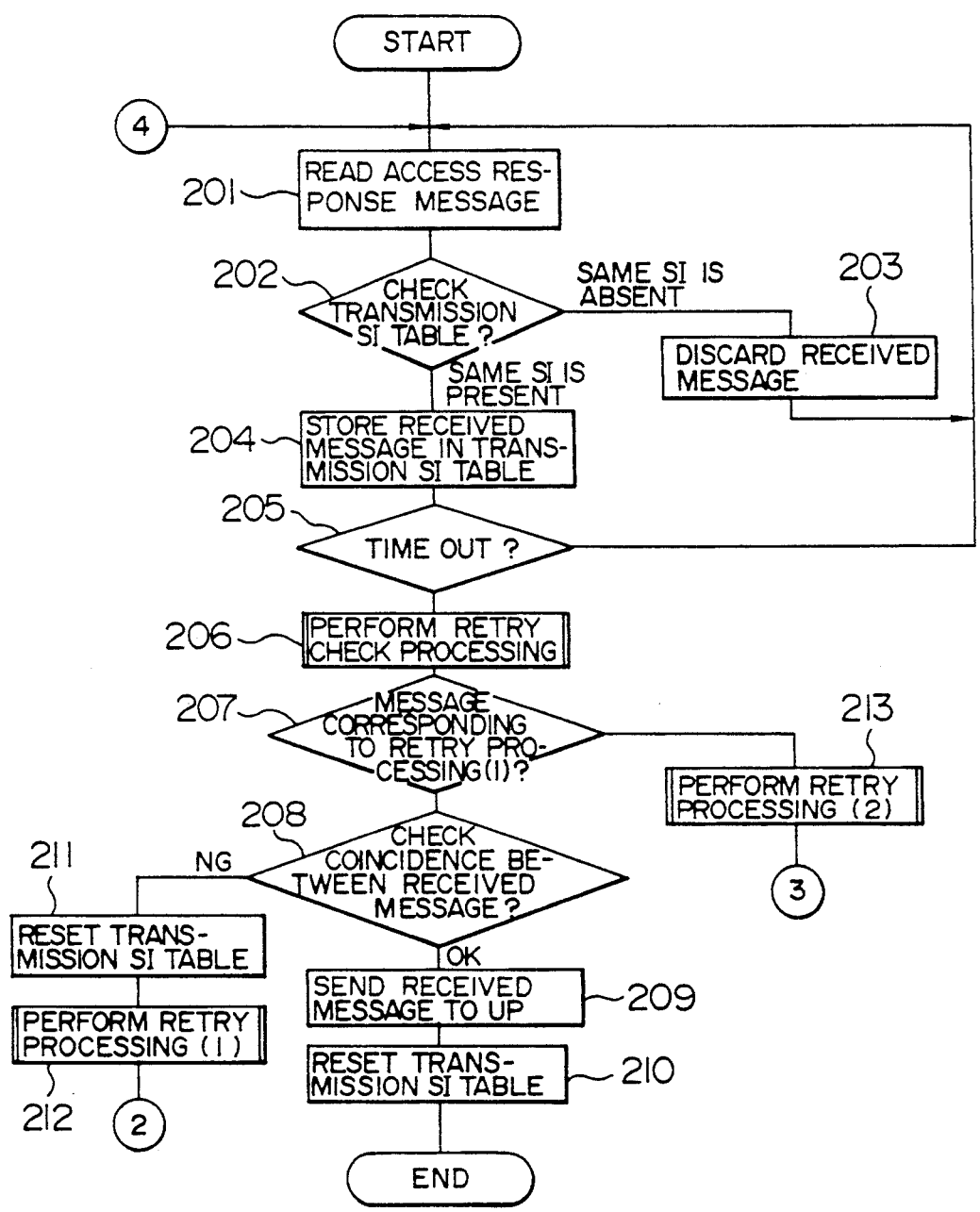
FIGS. 2A-2C totally are a flow chart showing a first embodiment of processing operation in the distributed processing system of FIG. 1 according to the present invention.
Figure 2B:
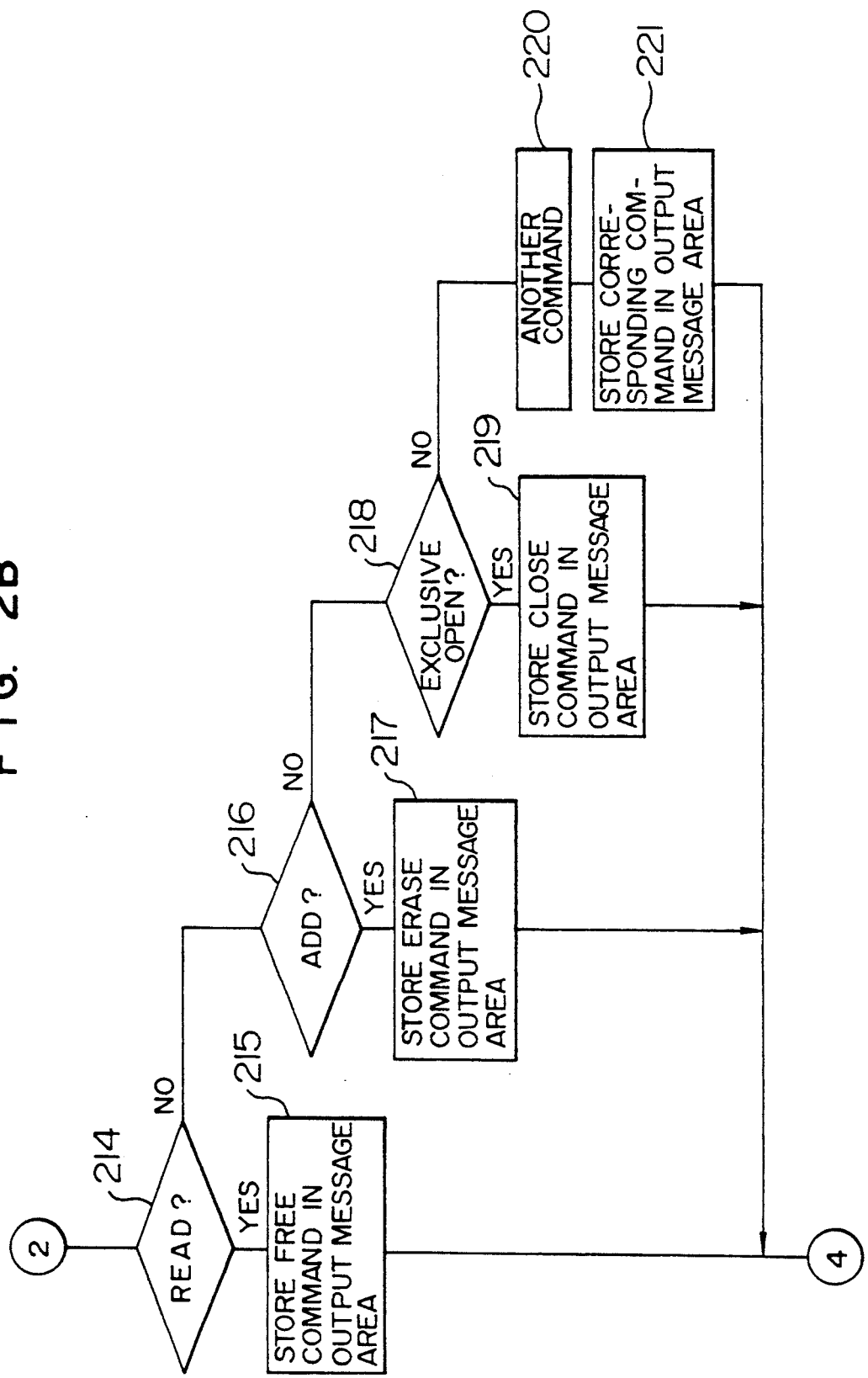
Figure 2C:
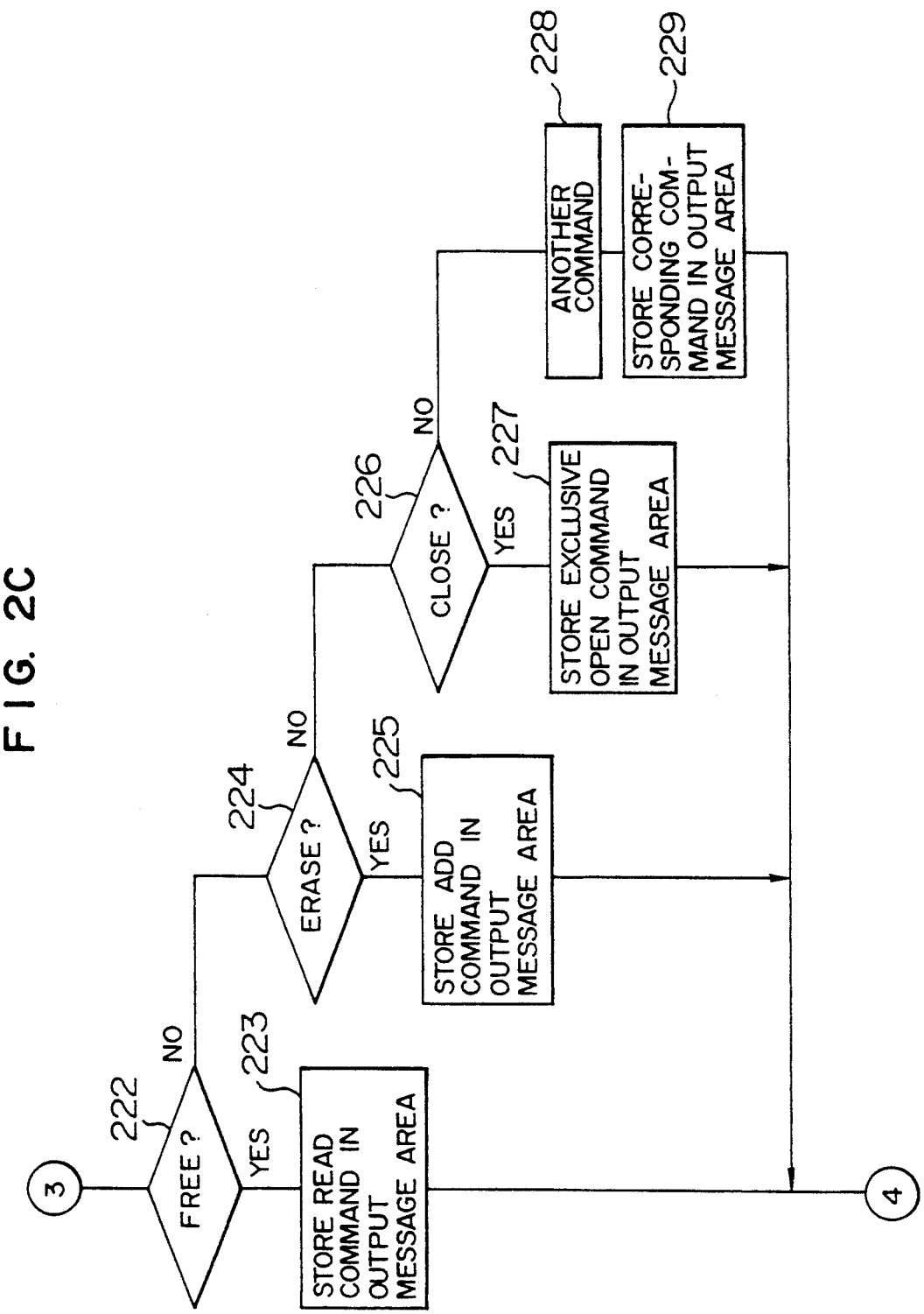

FIGS. 2A-2C show a flow chart showing a processing operation in the distributed processing system shown in FIG. 1.

The flow chart of FIGS. 2A-2C relates to the processing operation of the client file control module 106 shown in FIG. 1, and in particular, shows operation conducted when an access response message is received and operation of the first retry processing (hereafter referred to as retry processing (1)) and the second retry processing (hereafter referred to as retry processing (2)) according to the present invention.

The embodiment is concerned with a manner of collecting responses fed from replicated files for a predetermined time period and checking the matching between replicated files on the basis of the result of the response collection.

FIG. 2A shows by steps 201-206 a flow from readout of a received access response message until start of retry check processing including retry processings (1) and (2) and shows by the remaining a flow of retry check processing. FIGS. 2B and 2C show an example of retry processing (1) and an example of retry processing (2), respectively.

In FIG. 2A, the client file control module 106 reads out an access response message received from the network 4 and stored into the input message area (step 201), checks the transmission SI table, and determines whether the value of the source information section included in the access response message has already been registered in the source information area of the transmission SI table (step 202).

Unless registered, the access response message determined not to be a response to an access request generated by its own processor. Therefore, that message is discarded (step 203) and the next access response message is waited for.

If registered, the received access response message is stored in a received message area of the corresponding row (i.e., the row in which contents of the source information section included in the message are registered) of the transmission SI table (step 204). At this time, the value in the number area is incremented by one.

On the basis of the timer area of the transmission SI table, it is determined whether the timer set when the access request message was generated has reached time-out (step 205).

Unless time-out is reached, reception of the next message is waited for.

In case of time-out, a retry check processing including the retry processings (1) and (2) according to the present invention is performed (step 206).

Retry check processing will hereafter be described with reference to also in FIG. 2A.

It is checked whether the access response message stored in the transmission SI table is a message corresponding to the retry processing (1) (step 207).

Unless the access response message is a message corresponding to the retry processing (1), access response messages stored in the received message area of the transmission SI table are compared in contents (step 208).

As a comparing measure, there is also a method of comparing all contents of messages. In a method used herein, however, response messages are compared with regard to only the status information indicating a termination state of access processing.

If response messages coincide with each other in status information, matching between replicated files is ensured, and hence the received file access response message is sent to a user program such as the file (A) 12 of FIG. 1 (step 209).

Thereafter, the corresponding area of the transmission SI table is reset (step 210) to terminate the processing.

If at this time the number of received response messages is "0", information indicating a file fault is sent to the user program.

If at the step 208 the file access response messages do not coincide in termination status information, matching between replicated files cannot be ensured, and hence the corresponding area of the transmission SI table is reset (step 211) and the next retry processing (1) is performed depending upon the contents of the file access request command which has requested a response message (step 212).

If at the step 207 the access response message is a message corresponding to the retry processing (1), the retry processing (2) is performed (step 213).

The retry processing (1) will hereafter be described with reference to FIG. 2B.

First of all, if the access request is a READ command (step 214), an access request message having in the data section thereof a FREE command for cancelling such a state that the record is occupied by the exclusive control is generated and stored in the output message area (step 215).

If the access request is an ADD command (step 216), an access request message having in the data section thereof an ERASE command for deleting the record added by the ADD command is generated and stored in the output message area (step 217).

If the access request is the exclusive OPEN command (step 218), the file is occupied by the exclusive OPEN command and hence an access request message having in the data section thereof a CLOSE command for cancelling this state is generated and stored in the output message area (step 219).

In response to each access request message (step 220), an access request message having in the data section thereof a command for cancelling the file occupation state caused by each access request message is thus generated and stored in the output message area (step 221).

These messages (such as FREE, ERASE and CLOSE commands) are broadcasted to the network 4 in FIG. 1 by the communication control module.

Then, reception of an access response message for an access request message issued by such retry processing (1) is waited for.

With regard to the response message for the retry processing (1) as well, the processing flow of the steps 201-206 is followed. If it is confirmed at the step 207 that the received message is an access response message for a command issued by the retry processing (1), the retry processing (2) is performed (step 213).

The retry processing (2) will hereafter be described with reference to FIG. 2C.

In this retry processing (2), an access request message having in the data section thereof an access request command which has triggered the retry processing (1) is generated and stored in the output message area.

That is, if a FREE command is issued in the retry processing (1) (step 222), an access request message having a READ command in the data section thereof is generated and stored in the output message area (step 223).

If an access request message having an ERASE command in the data section thereof is generated in the retry processing (1) (step 224), an access request message having an ADD command in the data section thereof is generated and stored in the output message area (step 225).

If an access request message having a CLOSE command in the data section thereof is generated in the retry processing (1) (step 226), an access request message having an exclusive OPEN command in the data section thereof is generated and stored in the output message area (step 227).

In response to each access request message with the file occupation state cancelled by the retry processing (1) (step 228), the same access request message is thus generated again and stored in the output message area (step 229).

These messages (such as READ, ADD and exclusive OPEN commands) are broadcasted to the network 4 in FIG. 1 by the communication control module.

Retry processing (2) having the same contents as those of this retry processing (2) is issued by another processor as well. At this time, however, they differ from each other in issue timing. Therefore, mismatching between files due to messages issued by the retry processing (2) is not caused. The received message corresponding to this retry processing (2) becomes OK ("matching") as a result of a mismatching check made at the step 208, resulting in normal termination.

Even if mismatching between replicated files occurs, the mismatching state is cancelled by the retry processing (1) and thereafter the access processing is executed again by the retry processing (2) in the distributed processing system of the present embodiment. Therefore, matching between files is automatically ensured.

For the purpose of staggering execution time points of retry processing (2) performed by processors, random waiting time may be inserted before issue of the retry command of each retry processing (2).

Processing operation according to the present invention will hereafter be described further with reference to two file accesses indicated by solid line arrows (b) and broken line arrows (a) in FIG. 1.

FIG. 3 shows in time chart a processing operation according to an embodiment of the present invention in the distributed processing system of FIG. 1.

The time chart of FIG. 3 is based upon the processing operation shown in FIGS. 2A-2C, and shows the case where two user programs UPa 13 and UPb 23 of FIG. 1 simultaneously gain READ access to replicated files (A) 12 and 22, respectively.

If the UPa 13 issues a file access command (READ) 300 and makes an access request, the client file control module 106 transmits an access request message (READ) 301 corresponding to the file access command (READ) 300 to the file (A) 12 in its own processor disk and the file (A) 22 in the disk device 21 of the processor 2 of FIG. 1.

In this case, the file (A) 12 in its own processor which does not need intervention of the network 4 of FIG. 1 is processed earlier. Status information 302 indicating a result of processing for the file access command (READ) 300 of the file (A) 12 is transmitted to the UPa 13, and an access response is made.

It is now assumed that the UPb 23 has issued a similar file access command (READ) 320 for the same record as that of the UPa 13 concurrently with issue of the file access command (READ) 300 performed by the UPa 13.

Then, the client file control module 126 in the processor 2 transmits an access request message (READ) 321 corresponding to the file access command (READ) 320 generated by the UPb 23 to the file (A) 22 in its own processor disk device and the file (A) 12 in the disk device of the processor 1 in the same way.

In this case, the file (A) 22 in its own processor is processed earlier. And status information 322 indicating a result of processing for the file access command (READ) 320 of the file (A) 22 is transmitted to the UPb 23.

At this time, such a state that the UPa 13 is accessing the file (A) 12 and the UPb 23 is accessing the file (A) 22 occurs.

In this state, the access request message 321 corresponding to the file access con, hand (READ) 320 fed from the UPb 23 reaches the file (A) 12. On the other hand, the access request message 301 corresponding to the file access command (READ) 300 fed from the UPa 13 reaches the file (A) 22. Depending upon the contents of the file access commands 300 and 320 in this case, the access fault state described before by referring to FIG. 1 occurs even if the hardware in the system has no fault at all.

That is, the file access commands 300 and 320 are READ commands for updating files. Because of file access exclusive control, the access request message 321 corresponding to the file access command (READ) 320 of the UPb 23 with respect to a record of the file (A) 12 the UPa 13 which is reading is rejected as an exclusive error and it is not accepted.

In the same way, the access request message 301 corresponding to the file access command (READ) 300 of the UPa 13 which has reached the file (A) 22 is also rejected as an exclusive error.

If in this state the UPa 13 and the UPb 23 perform write processings, the subject record of the file (A) 12 is updated by the UPa 13 and the subject record of the file (A) 22 is updated by the UPb 23. Therefore, the file (A) 12 differs in contents from the file (A) 22.

In order to resolve such problems of a file mismatching state, each processor in the distributed processing system of FIG. 1 checks coincidence between response data fed from replicated files. If noncoincidence between response data is detected, the processor issues an instruction for cancelling the access instruction issued for replicated files by its own processor and thereafter issues the same access instruction again.

That is, status information items 302 and 303 of access response messages fed from the files (A) 12 and 22 corresponding to the file access command (READ) 300 generated by the UPa 13 differ from each other. Therefore, the client file control module 106 of the processor 1 which is executing the UPa 13 executes retry processing (1) 304 described before by referring to FIG. 3 and issues a cancel request message (FREE) 305 for cancelling the access request message (READ) 301.

By the cancel request message (FREE) 305, the state of occupation of the file (A) 12 by the UPa 13 is cancelled.

In the same way, status information items 322 and 323 of access response messages fed from the files (A) 12 and 22 corresponding to the file access command (READ) 320 generated by the UPb 23 differ from each other. Therefore, the client file control module 126 executes a retry processing (1) 324 shown in FIG. 3 and issues a cancel request message (FREE) 325 for cancelling the access request message (READ) 321.

By the cancel request message (FREE) 325, the state of occupation of the file (A) 22 by the UPb 23 is cancelled.

Respective client file control modules 106 and 126 are informed of cancel of these occupation states by response messages 306, 307, 326 and 327.

In such a state that neither the file (A) 12 nor 22 is occupied, the client file control modules 106 and 126 respectively of processors 1 and 2 executing the UPa 13 and UPb 23 reissue access request messages (READ) 309 and 329, which are respectively identical with the access request messages (READ) 301 and 321, by retry processings (2) 308 and 328 described before with reference to FIG. 3.

The retry processings (1) 304 and 324 and the retry processings (2) 308 and 328 heretofore described are repeated until the access processing succeeds.

However, the access request messages (READ) 309 and 329 by the retry processing (2) 308 and 328 are issued by the processors 1 and 2 at their individual timings. Therefore, issue time points of the access request messages (READ) 309 and 329 are automatically staggered. As for the access request messages (READ) 309 and 329 issued respectively by the retry processings (2) 308 and 328, occurrence of the mismatching state thereof is automatically avoided.

In order to stagger the retry execution time points in the UPa 13 and UPb 23, random waiting time may be inserted before issue of the retry commands (access request messages (READ)) 309 and 329 respectively in the retry processing (2) 308 and 328. As a result, file access based upon the retry processings (2) 308 and 328 can be successfully executed.

The method heretofore described is a method of collecting responses fed from replicated files for a predetermined time and checking the matching between replicated files on the basis of the result of response collection.

On the other hand, a method of collecting responses from replicated files by a number equivalent to a predetermined replication degree instead of collecting responses from replicated files for a predetermined time interval also be used. A second embodiment of the present invention using such a method will now be described.

In order to implement the present second embodiment, a replication degree area indicating the replication degree of files is set in each of the transmission SI table 107 and the file control table 110 shown in FIG. 1.

Figure 4A:
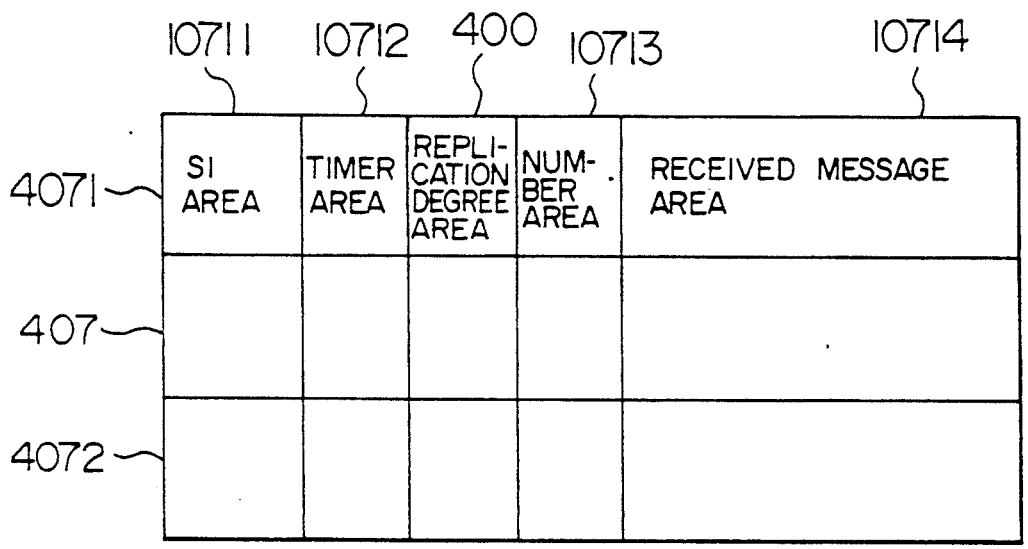
FIGS. 4A and 4B show schematic diagrams showing examples of formats of a transmission SI table and a file, control table or administration table of FIG. 1, respectively.
Figure 4B:
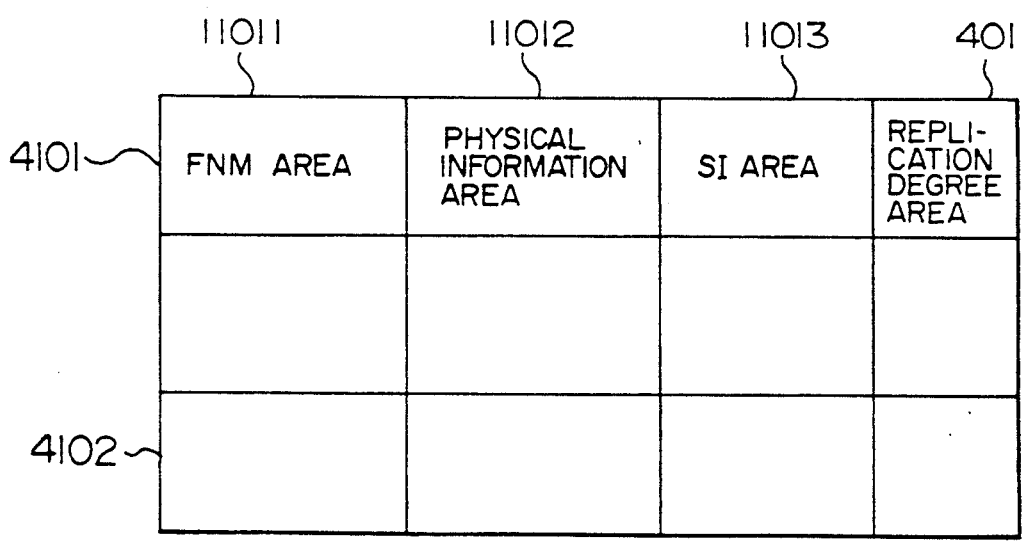

FIGS. 4A and 4B show a modification of the formats of the transmission SI table and the file control table illustrated in FIG. 1.

In each of rows 4071–4072, a transmission SI table 407 shown in FIG. 4A includes a replication degree area 400 in addition to the SI area 10711, the timer area 10712, the number area 10713 and the received message area 10714. In each of rows 4101–4102, a file control table 410 shown in FIG. 4B includes a replication degree area 401 in addition to the FNM area 11011, the physical information area 11012 and the SI area 11013.

It is now assumed that the replication degree area 401 of the file control table 410 is set in each processor at the time of file allocation.

Further, the server file control module 109 shown in FIG. 1 sets contents of the replication degree area 401 of the file control table 410 into the access response message corresponding to the access request as replication degree information.

On the other hand, the client file control module 106 sets the replication degree within the message into the replication degree area 400 of the transmission SI table 407 when the response message corresponding to the OPEN command is received.

In the distributed processing system of the second embodiment having this transmission SI table 407 and the file control table 410, the client file control module 106 of FIG. 1 checks on matching between access response messages stored in the received message area at the time of reception of the access response message, on the basis of the replication degree areas 400 and 401 provided in the transmission SI table 407 and the file control table 410.

In this way, a check is made on matching between access response messages when a predetermined number of response message is received at the client even before a predetermined time period. As a result, a retry check processing having an efficiency better than that of the processing shown in the flow chart of FIGS. 2B-2C can be accomplished.

Figure 5:
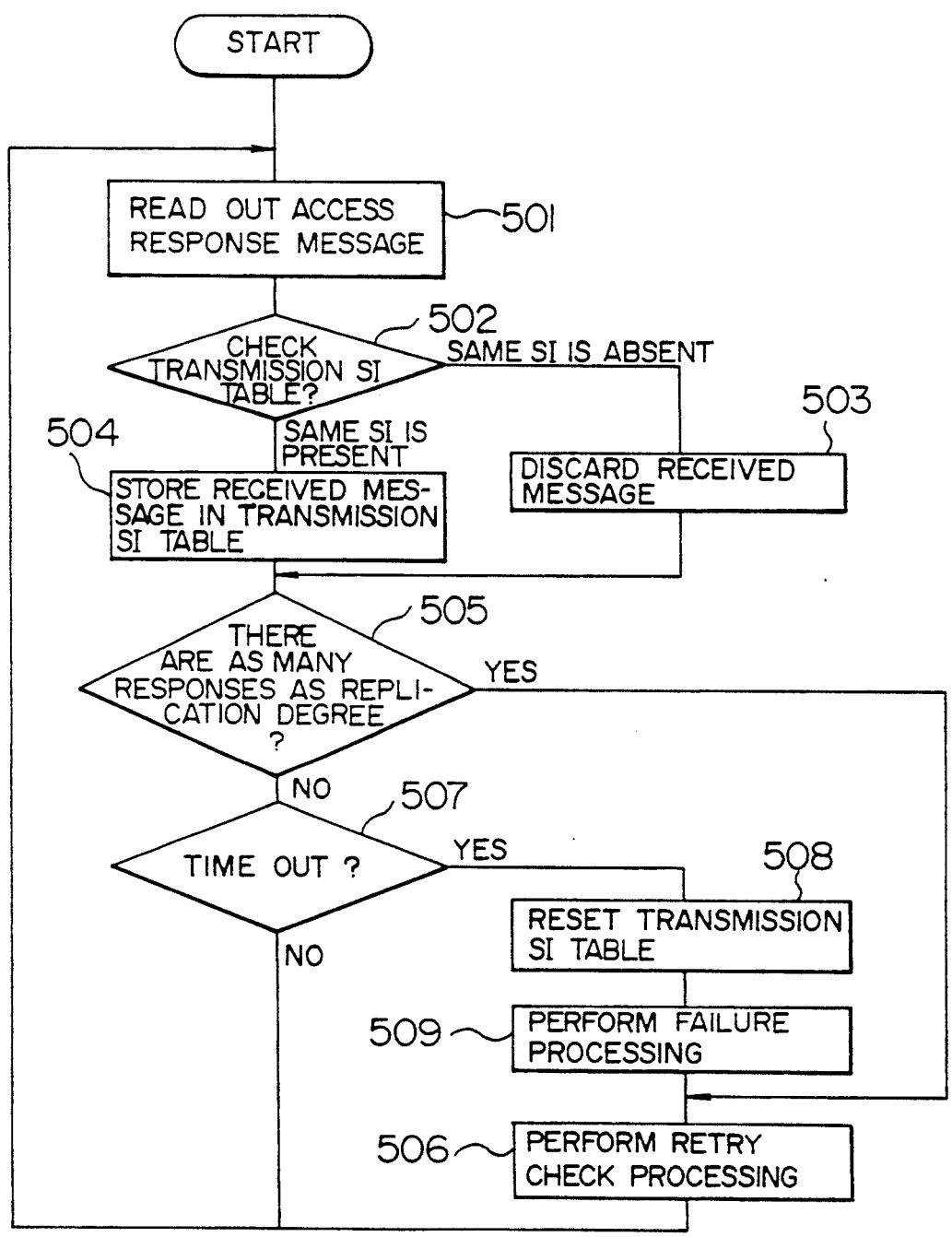
FIG. 5 is a flow chart showing a second embodiment of processing operation in the distributed processing system of FIG. 1 according to the present invention.

FIG. 5 shows in flow chart processing operation according to the second embodiment of the present invention which is a modification of the distributed processing system of FIG. 1.

In FIG. 5 reference is made of operation of the distributed processing system having the transmission SI table 407 and the file control table 410 shown in FIGS. 4A and 4B, and in particular a flow of processing performed by the client file control module 106 shown in FIG. 1.

First of all, the client file control module reads out the access response message received from the network and stored in the input message area (step 501), makes a check on the transmission SI table, and determines whether the value of the source information section in the access response message is already registered in the source information area of the transmission SI table (step 502).

Unless already registered, the message is not a response to an access request generated by its own processor, and hence that message is discarded (step 503) and the next access response message is waited for.

If already registered, the access response message is stored into the received message area of the corresponding row (in which the contents of the source information section in the message are registered) of the transmission SI table (step 504). At this time, the value in the number area is incremented by one.

The processing so far is identical with the steps 201-204 with respect to FIG. 2A.

Then, it is determined whether the value stored in the number area within the transmission SI table, i.e., the number of received access response messages coincides with the value stored in the replication degree area 400 shown in FIG. 4A (step 505).

If the number of received access response messages coincides with the value of the replication degree or area, i.e., responses are returned from all of the replicated files, retry check processing which is identical with the step 206 shown in FIG. 2A is performed (step 506).

In case of noncoincidence, a time-out check which is identical with the step 205 shown in FIG. 2A is made (step 507). That is, it is determined on the basis of the timer area 10712 of the transmission SI table 407 shown in FIG. 4 whether the timer set at the time of occurrence of the access request message has reached time-out.

Unless time-out is reached, the process returns to such a state that reception of the next message is waited for.

In case of time-out, the transmission SI table 407 of FIG. 4A is reset (step 508), then a fault processing is performed (step 509), and thereafter, a retry check processing of the step 506 is performed.

In the fault processing, the value of the number area 10713 is set as the value of the replication degree area of the transmission SI table 407 shown in FIG. 4A.

In the second embodiment, a retry check processing can thus be performed at the timing of reception of as many response messages as the replication degree.

Thereby, the response performance is improved as compared with the first embodiment.

A third embodiment of the distributed processing system shown in FIG. 1 will now be described.

In the third embodiment, control is returned to the UPa 13 in the arrangement shown in FIG. 1 when a response from the file (A) 12 in the disk device 11 of the processor 1 is returned, and matching between replicated files is ensured.

That is, a retry check processing is performed when all of responses from replicated files are obtained in the first and second embodiments shown in FIGS. 2 and 5. From the viewpoint of response performance, therefore, the following problem occurs.

For example, it is now assumed in FIG. 1 that the UPa 13 which is executing in the processor 1 accesses the files (A) 12 and 22 replicated in the disk device 11 of its own processor and the disk device 21 of the processor 2. In this case, the time of return of the access response to the UPa 13 is set in the first and second embodiments to the time of return of the response of the file (A) 22 via the network 4 in spite of the fact that the UPa 13 is accessing the file (A) 12 of the disk device 11 of its own processor.

In the third embodiment, such lowering of response performance is prevented.

In the third embodiment, configurations of the transmission SI table and file control table are identical with those of the second embodiment shown in FIG. 4. However, one of replicated files is used as a preferential file when a conflict has occurred.

The preferential file may be specified at the time of file allocation. Instead of specification by the user, a file belonging to the smallest processor number, for example, among replicated files which have returned responses at the time of file opening may be used as the preferential file.

Processing operation of the third embodiment will hereafter be described with reference to FIG. 6.

FIG. 6 embodies in a flow chart, the third embodiment of processing relating to the present invention in the distributed processing system shown in FIG. 1.

In the same way as the first and second embodiments, FIG. 6 shows a processing flow of the client file control module 106 of FIG. 1 at the time of reception of an access response message.

Figure 6A:
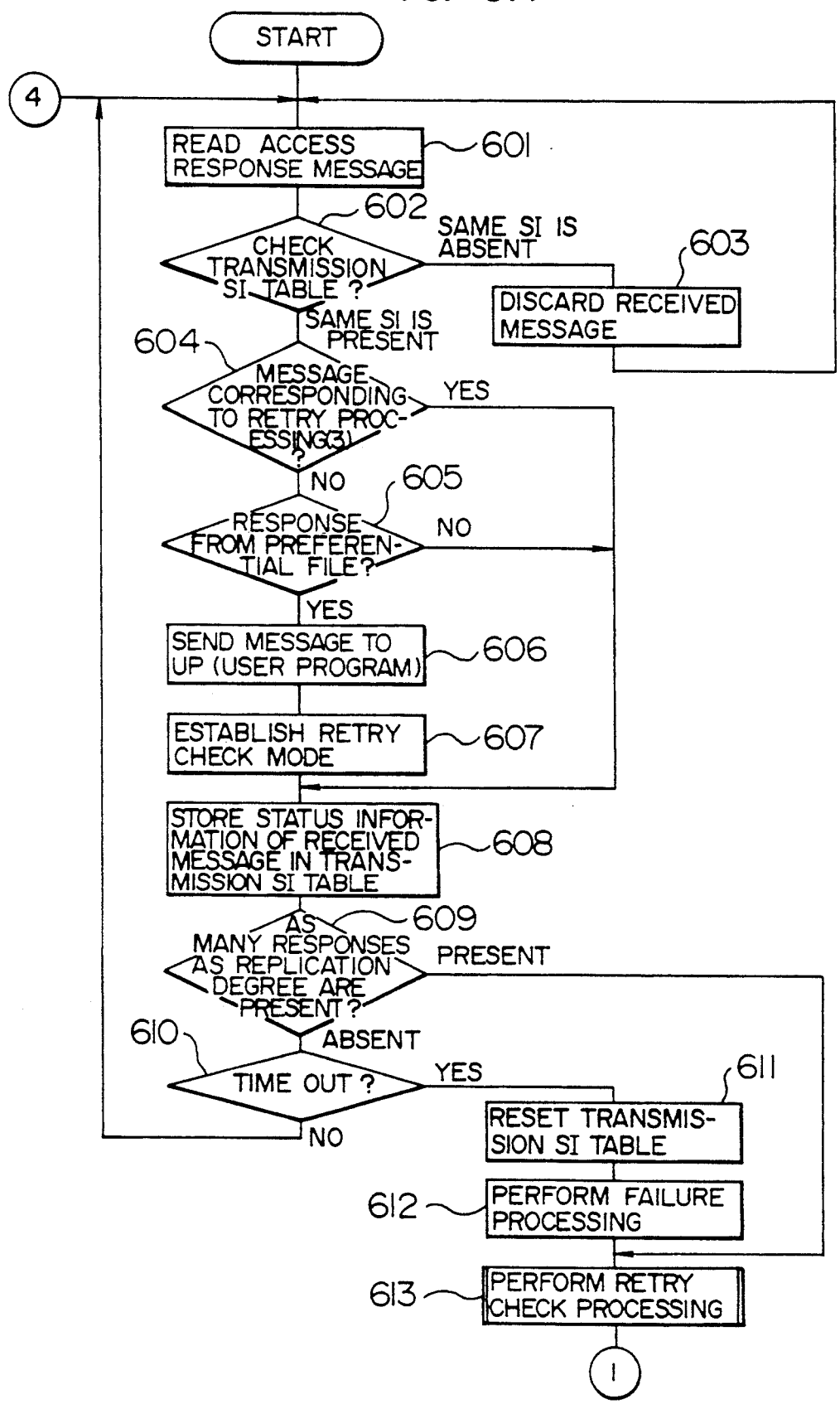
Figure 6C:
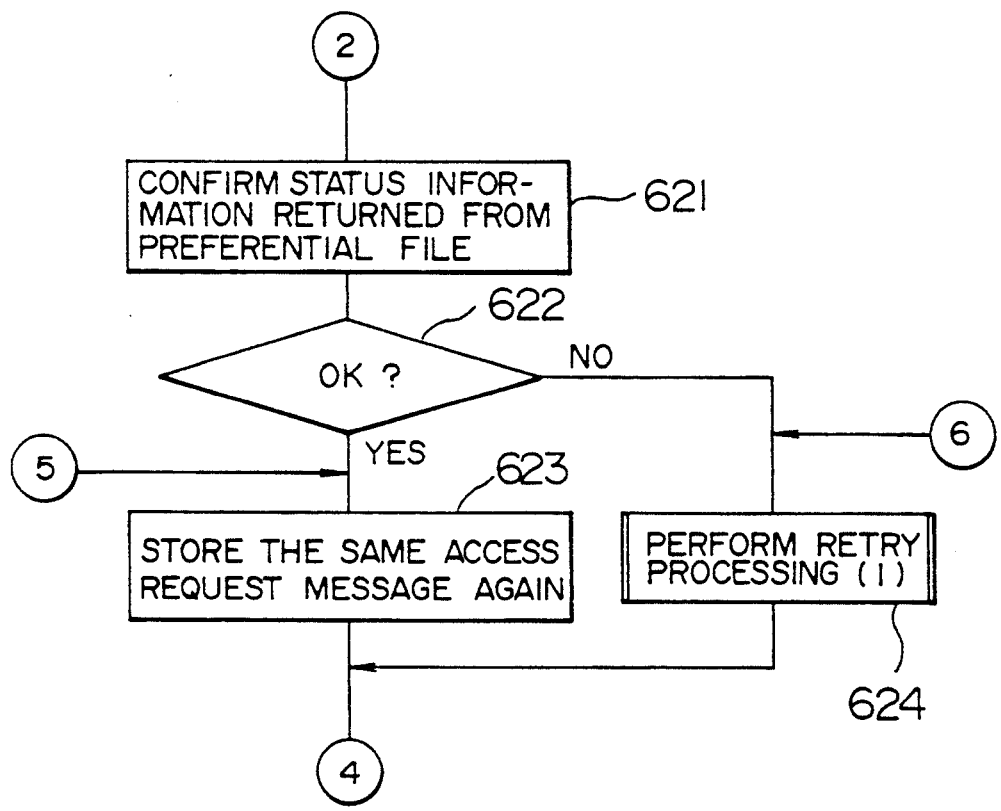
Figure 6D:
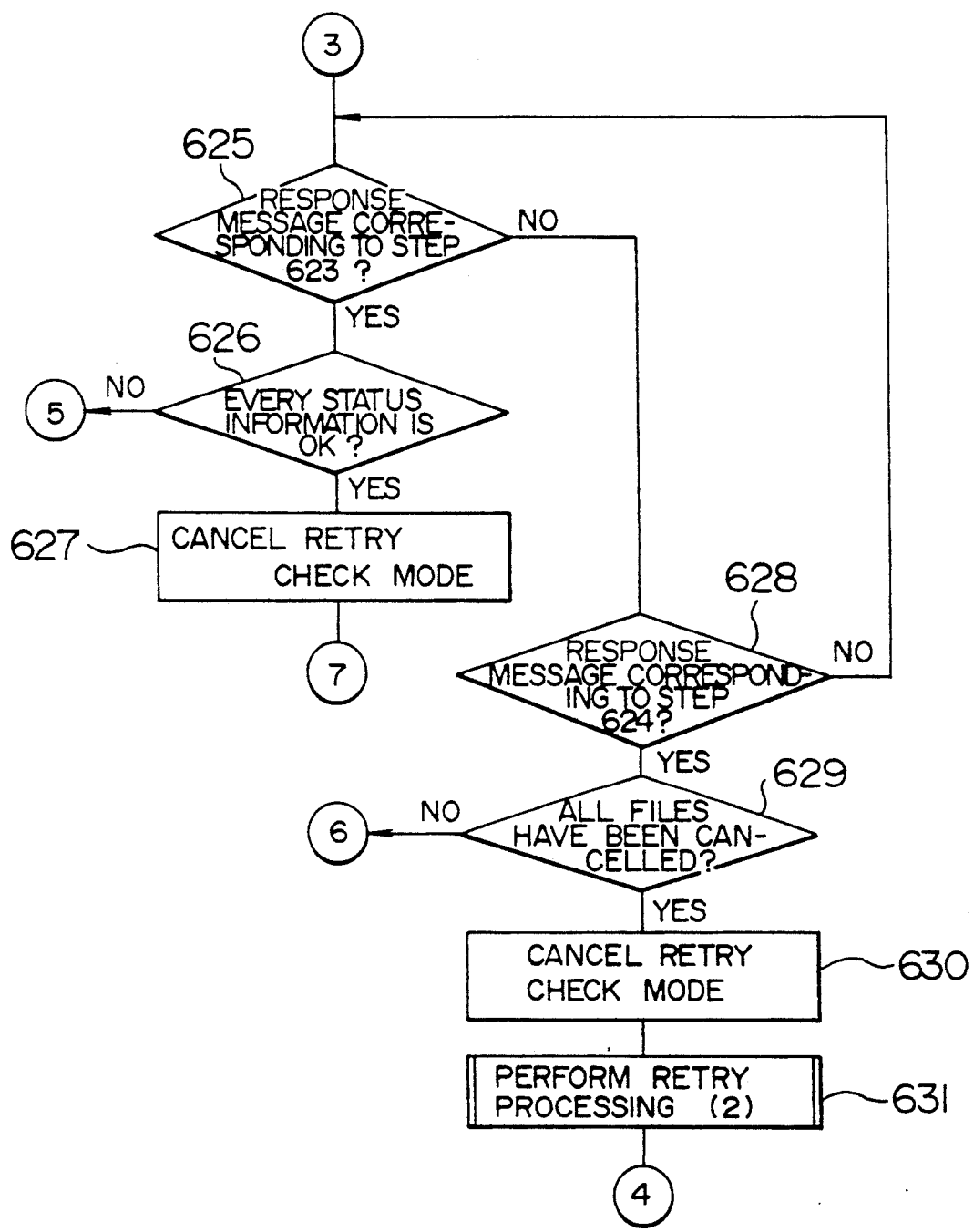

FIG. 6A is a processing flow ranging from readout of a received access response message until retry check processing in the present third embodiment. FIG. 6B is a processing flow of retry check processing in the third embodiment. FIGS. 6C and 6D are processing flows of retry processings (3) and (4) in the third embodiment, respectively.

Processing ranging from the readout of the access response message until retry check processing in the third embodiment will now be described on the basis of FIG. 6A.

First of all, the client file control module reads out the access response message received from the network and stored in the input message area (step 601), makes a check on the transmission SI table, and determines whether the value of the source information section in the access response message is already registered in the source information area of the transmission SI table (step 602).

Unless already registered, the message is not a response to an access request generated by its own processor, and hence that message is discarded (step 603) and the next access response message is waited for.

The processing so far is identical with that of the first and second embodiments respectively shown in FIGS. 2 and 5.

If already registered, otherwise, it is checked whether the access response message is a message corresponding to retry processing (3) which will be described later (step 604).

If the message is a message corresponding to the retry processing (3), the process advances to step 608.

Unless the message is a message corresponding to the retry processing (3), it is determined whether the message is a response from a preferential file (A) (step 605).

Unless the message is a response from the preferential file (A), the process advances to step 608 which will be described later. If the message is a response from the preferential file (A), the message is sent to a user program which is the destination of the request (UPa 13 of FIG. 1 in the example) (step 606) and a retry check processing mode is established (step 607).

Then, status information of this message is stored into the transmission SI table (step 608), and it is determined whether as many responses as the replication degree have been received (step 609).

If as many responses as the replication degree have already been received, the process proceeds to step 613 which will be described later and a retry check processing is performed. Unless as many responses as the replication degree have already been received, it is determined whether a time-out has been reached (step 610).

Unless the time-out is reached, the process returns to the step 601 an and the next received message is read out.

In case of time-out, the transmission SI table is reset (step 611), a fault processing is performed (step 612) and the process advances to the retry check processing 613.

In the fault processing, the value of the number area 10713 is set as the value of the replication degree area of the transmission SI table 407 shown in FIG. 4.

By the processing of steps 605–607 described above, control is returned in the third embodiment to the UPa 13 of FIG. 1, which has requested a response message, at the time of reception of a response from the file of its own processor. Even if an access command from another user program is accepted in the retry check mode, the client file control module postpones its process execution until the retry check mode is cancelled.

That is, when an access response message fed from the file (A) 12 which is a preferential file is received in FIG. 1, the processing of the steps 601–605 is performed, the access response message is send to the UPa 13 at the step 606, and thereafter the processes of the step 607 and succeeding steps are executed.

When an access response message fed from the file (A) 22 which is not a preferential file is received, however, the processes advance from the step 606 to the step 608 and a determination processing at the step 609 is performed.

If as many responses as the replication degree is being received at this time, the retry check processing of the step 613 is executed.

Retry check processing in the third embodiment will now be described with reference to FIG. 6B.

In the retry check processing, it is first determined whether the received response message is a message corresponding to retry processing (3) which will be described later (step 614).

Unless the received response message is a message corresponding to the retry processing (3), it is checked whether response messages registered in the transmission SI table coincide in status information (step 615).

In case of coincidence, the pertinent portion of the transmission SI table is reset (step 616). Further, the retry check mode set in the processing of the step 607 is cancelled (reset) (step 617), and the retry check processing is terminated.

On the other hand, if access response messages have different status information OK (successful) and NG (fail) in the processing of the step 615, the transmission SI table is reset (step 618) and the retry processing (3) which will be described later is executed (step 619).

If the received response message is a message corresponding to the retry processing (3) at the step 614, a retry processing (4) which will be described later is executed (step 620).

With reference to FIG. 6C, the retry processing (3) in the third embodiment will now be described.

In the retry processing (3), a process hereafter described is executed.

First of all, the result (OK or NG) of a response returned from the preferential file is determined (step 621).

If the response from the preferential file is OK (step 622), then the access request message for the command which has triggered the access response message is stored in the output message area 105 in FIG. 1 again (step 623), and a processing of the received message beginning with the step 601 is performed on the basis of transmission performed by the communication control module 102 in FIG. 1.

On the other hand, if the response from the preferential file is NG, the retry processing (1) described before by referring to the step 212 in FIG. 2 is executed (step 624). That is, the access request message of the status cancel command (such as FREE, ERASE and CLOSE) for the issue command which has triggered the access response message is stored into the output message area 105 in FIG. 1, and the processing of the received message beginning with the step 601 is performed on the basis of the transmission performed by the communication control module 102 in FIG. 1.

The response message for the retry processing request message generated by the retry processing (3) is confirmed at the steps 604 and 614, and the retry processing (4) of the step 620 is executed.

With reference to FIG. 6D, the retry processing (4) in the third embodiment will now be described.

First of all, in case of a response message obtained when the response from the preferential file in the retry processing (3) is OK, i.e., if the response is a response message corresponding to the processing of the step 623 (step 625) and the status information of the response message fed from every file, in which the status information of the access response message was NG, becomes OK (step 626), then the retry check mode set at the step 607 is cancelled (step 627) and the processing is terminated.

Unless the status information of the response message fed from every file is OK, then the process advances to the step 623, and a re-access request message is stored into the output message area again.

On the other hand, in case of a response message obtained when the response from the preferential file in the retry processing (3) is NG, i.e., if the response is a response message corresponding to the processing of the step 624 (step 628) and every file in which the status information was OK, is cancelled by the state cancel request message (step 629), then the retry check mode set at the step 607 is cancelled (step 630) and the retry processing (2) shown in FIG. 2 is performed (step 631). That is, the first access request message which has caused file mismatching is stored into the output message area.

If it is found at the step 629 that every file in which the status information was OK, has not been cancelled, the process advances to the step 624 and the retry processing (1) is performed again.

Even if mismatching between files occurs in the third embodiment, all of the contents of replicated files thus coincide with the contents of the preferential file and matching between files is ensured. Further, control is returned to the user program at the time of return of the response from the preferential file, lowering of response performance caused by checking the matching between replicated files being thereby prevented.

Operation of the distributed processing system according to third embodiment will now be described by using time charts.

FIG. 7 shows time charts illustrating the processing operation of the embodiments according to the present invention in distributed processing systems having the transmission SI table and the file control table of FIG. 4.

Figure 7A:
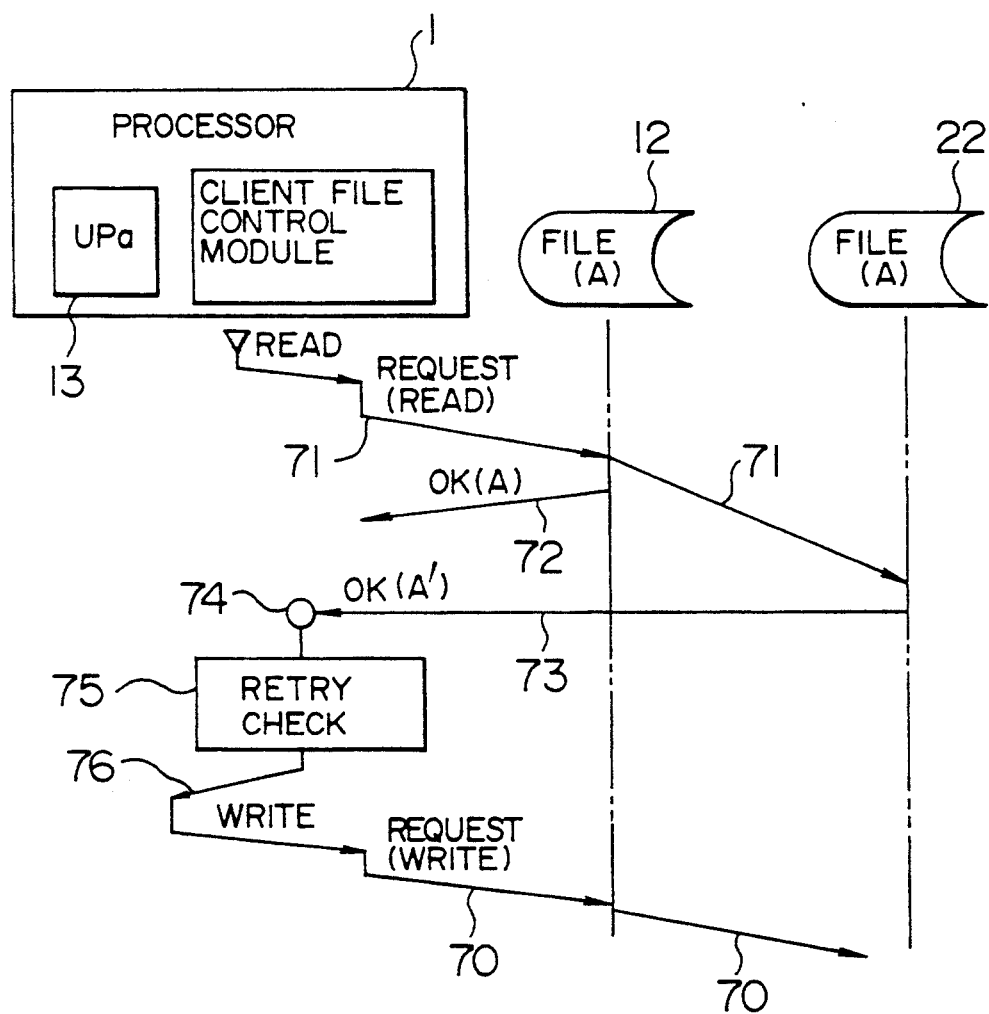
FIGS. 7A and 7B show time charts showing processing operation in a distributed processing system having the transmission SI table and the file control table as shown in FIG. 4A and 4B according to another embodiment of the present invention.
Figure 7B:
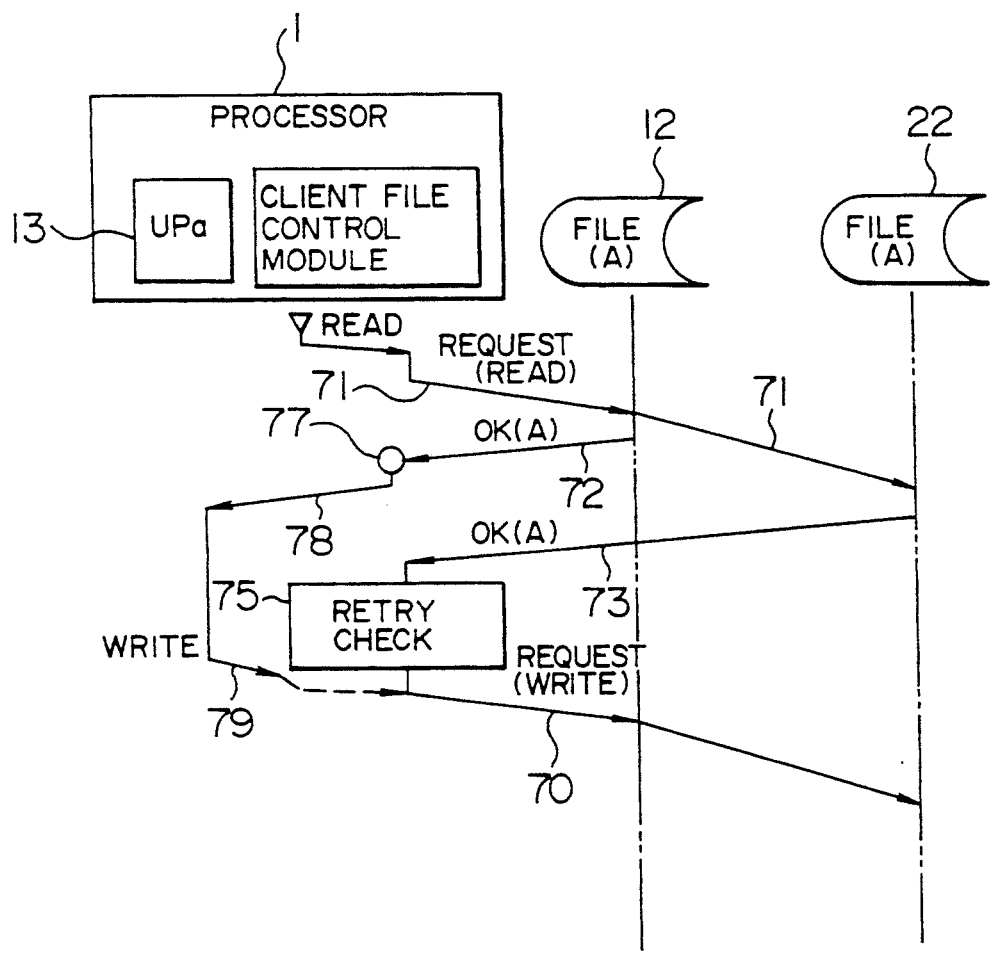

FIG. 7A is a time chart for the first and second embodiments, and FIG. 7B is a time chart for the third embodiment.

In the first and second embodiments, retry check processing 75 is performed at time 74 of return of responses (response messages 72 and 73) from the files (A) 12 and 22 for a request message 71 issued from the UPa 13 as shown in FIG. 7A. If the result of retry check processing 75 is OK, return 76 of control to the UPa 13 is performed.

On the other hand, the file (A) 12 is first defined as the preferential file in the third embodiment as shown in FIG. 7B. In the present third embodiment, return 78 of control to the UPa 13 is then performed at time 77 of return of the response message 72 from the preferential file (A) 12 for the request message 71 generated by the UPa 13.

Thereafter, the retry check 75 is performed at the time of return of the response message 73 from the file (A) 22.

A command (WRITE), which is issued by the UPa 13 before the retry check 75 is terminated, is transmitted to the files (A) 12 and 22 as an access request message 70 after the termination of the retry check 75.

In the third embodiment, control is thus returned to the user program at the time of return of the response message from the file in the disk device of its own processor, which is the preferential file, lowering of response performance caused by checking the matching between replicated files being thereby prevented.

The method of checking response messages returned from replicated files as shown in the third embodiment, i.e., the method of first sending a first coming message to the user program and checking, at the time of reception of a later coming message, the matching between the latter coming message and the earlier coming message can also be similarly applied to the case where various resources such as programs or printers are multiplexed or replicated.

Even if mismatching between replicated files occurs in the first to third embodiments, the mismatching can be automatically cancelled as heretofore described by referring to FIGS. 1 to 7.

Further, control is returned to the user program by the response message of the first received file, and thereafter matching between files is checked. Thereby, lowering of response performance caused by checking of the matching between replicated files is prevented.

The retry checks made in the first to third embodiments are checks required at the time of file update, and they are not necessary in the case where the file is open in the "READ ONLY" mode, for example. In an alternative method, therefore, the file open mode is judged. Unless the file is open in the update mode in this alternative method, retry check processing is not performed in the client file control module 106 in FIG. 1, but an access response message received earlier is sent to the user program at the time of reception. At this time, an access response message received later is discriminated and discarded. By this method, the response performance in case of access using a mode other than the file update mode can be improved.

Especially, in the third embodiment, it thus becomes possible to check the mismatching state caused between replicated files without lowering the file access response and upon occurrence of a mismatching state, it becomes possible to automatically remove the mismatching state without making the user program conscious of that.

As a result, important files can be replicated with an arbitrary replication degree. In addition, access response performance is not lowered at that time. This results in not only improved file reliability but also improved convenience for user's use.

Even if mismatching occurs between files replicated with an arbitrary replication degree, the present invention makes possible automatic recovery from the mismatching state without interrupting the processing of file access. The present invention also makes it possible to detect a mismatching state caused among replicated files without lowering the file access response performance. As a result, the processing performance and reliability of distributed processing systems can be improved.

We claim:

1. A replicated data processing method for a distributed processing system having a plurality of processors connected to each other via a common transmission medium and information resources replicated in different processors, said method, being executed in each processor of said plurality of processors, comprising the steps of:

outputting data from said information resources in said processor to said common transmission medium;

receiving, at said processor, replicated data from said plurality of processors on said common transmission medium, said replicated data having first received replicated data and replicated data subsequently received;

performing processing using said first received replicated data beginning at a time before receipt of said replicated data subsequently received;

checking content correspondence between said first received replicated data and said replicated data subsequently received; and performing an abnormality processing in response to a result of said checking step indicating that a content correspondence is determined to be abnormal.

2. A replicated data processing method for a distributed processing system according to claim 1, wherein said information resources correspond to files replicated in each of external storage media respectively connected to said plurality of processors, and an arbitrary processor among said plurality of processors issues an access request to access said replicated files, receives replicated response data from said replicated files corresponding to said access request, performs said processings by using first received replicated response data from among said replicated response data, and performs said checking between first received replicated response data and replicated response data and replicated response data received thereafter.

3. A replicated data processing method for a distributed processing system according to claim 2, wherein said arbitrary processor which has issued said access request does not generate a next file access request until checking of content correspondence between said replicated response data is completed.

4. A replicated data processing method for a distributed processing system according to claim 3, wherein upon detection of an abnormality by checking of content correspondence between said replicated response data, said arbitrary processor which has issued said access request performs a first retry processing to issue an instruction for cancelling data established by said access request, performs a second retry processing for generating said access request again after said data has been cancelled by said first retry processing, and repeats said first retry processing and said second retry processing until an abnormality between said replicated response data is no longer detected.

5. A replicated data processing method for a distributed processing system according to claim 4, wherein said arbitrary processor which has issued said access request executes said second retry processing at a predetermined time period after said first retry processing.

6. A replicated data processing method for a distributed processing system according to claim 4, wherein said arbitrary processor which has issued said access request collects all replicated response data fed from said replicated files and performs said processing after checking of content correspondence among all of said collected replicated response data and determination of content correspondence between said replicated response data conducted by said first retry processing and said second retry processing.

7. A replicated data processing method for a distributed processing system according to claim 4, wherein said arbitrary processor which has issued said access request performs said first retry processing and said second retry processing on a basis of a check on content correspondence among all replicated response data fed from said replicated files and collected within a preset time.

8. A replicated data processing method for a distributed processing system according to claim 7, wherein if all of replicated response data from said replicated files cannot be collected within said preset time, said arbitrary processor which has issued said access request performs a fault processing for limiting said checking on content correspondence to replicated response data collected within said preset time and performs said checking, said first retry processing and said second retry processing after performing said fault processing.

9. A replicated data processing method for a distributed processing system according to claim 4, wherein as said first retry processing, said arbitrary processor which has issued said access request issues, if said access request was a read command, a free command for canceling an occupation state of a record established by exclusive control of said read command, issues, if said access request was an addition command, an erase command for delating a record added by said addition command, and issues, if said access request was an exclusive open command, a close command for canceling an occupation state of a file established by said exclusive open command.

10. A replicated data processing apparatus in a distributed processing system having a plurality of processors connected to each other via a common transmission medium and information resources replicated in different processors, wherein said apparatus, being included in each processor of said plurality of processors, comprises:

an output circuit for outputting data from said information resources in said processor to said common transmission medium;
a receiving circuit for receiving, at said processor, replicated data from said plurality of processors on said common transmission medium, said replicated data having first received replicated data and replicated data subsequently received;
a processing circuit for performing processing using said first received replicated data beginning at a time before receipt of replicated data subsequently received;
a checking circuit for checking content correspondence between said first received replicated data and said replicated data subsequently received; and
an abnormality testing circuit for performing an abnormality processing in response to a output of said checking circuit indicating that a content correspondence is determined to be abnormal.

11. A replicated data processing apparatus according to claim 10, further comprising:
external storage media respectively connected to said plurality of processors for storing, as said information resources, files replicated with respect to said plurality of processors;
wherein an arbitrary processor among said plurality of processors issues an access request to access said replicated files, receives replicated response data from said replicated files corresponding to said access request, performs said processing by using first received replicated response data from among said replicated response data, and performs said checking between first received replicated response data and replicated response data received thereafter.

12. A replicated data processing apparatus according to claim 11, wherein said arbitrary processor which has issued said access request does not generate a next file access request until checking of content correspondence between said replicated response data is completed.

13. A replicated data processing according to claim 12, wherein upon detection of an abnormality by checking of content correspondence between said replicated response data, said arbitrary processor which has issued said access request performs a first retry processing to issue an instruction for cancelling data established by said access request, performs a second retry processing for generating said access request again after said data has been cancelled by said first retry processing, and repeats said first retry processing and said second retry processing until an abnormality between said replicated response data is no longer detected.

14. A replicated data processing according to claim 13, wherein said arbitrary processor which has issued said access request executes said second retry processing at a predetermined time period after said first retry processing.

15. A replicated data processing according to claim 13, wherein said arbitrary processor which has issued said access request collects all replicated response data fed from said replicated files and performs said processing after checking of content correspondence among all of said collected replicated response data and determination of content correspondence between said replicated response data conducted by said first retry processing and said second retry processing.

16. A replicated data processing according to claim 13, wherein said arbitrary processor which has issued said access request performs said first retry processing and said second retry processing on a basis of a check on content correspondence among all replicated response data fed from said replicated files and collected within a preset time.

17. A replicated data processing according to claim 16, wherein if all of replicated response data from said replicated files cannot be collected within said preset time, said arbitrary processor which has issued said access request performs a fault processing for limiting said checking on content correspondence to replicated response data collected within said preset time and performs said checking, said first retry processing and said second retry processing after performing said fault processing.

18. A replicated data processing according to claim 13, wherein as said first retry processing, said arbitrary processor which has issued said access request issues, if said access request was a read command, a free command for canceling an occupation state of a record established by exclusive control of said read command, issues, if said access request was an addition command, an erase command for delating a record added by said addition command, and issues, if said access request was an exclusive open command, a close command for canceling an occupation state of a file established by said exclusive open command.

* * * * *